US011988184B2

(12) United States Patent
Rabban et al.

(10) Patent No.: US 11,988,184 B2
(45) Date of Patent: May 21, 2024

(54) ENGINE IGNITION SYSTEM WITH MULTIPLE IGNITION EVENTS

(71) Applicant: Walbro LLC, Cass City, MI (US)

(72) Inventors: Duried F. Rabban, Henderson, NV (US); Bradley J. Roche, Millington, MI (US)

(73) Assignee: Walbro LLC, Cass City, MI (US)

( * ) Notice: Subject to any disclaimer, the term of this patent is extended or adjusted under 35 U.S.C. 154(b) by 0 days.

(21) Appl. No.: 17/606,880

(22) PCT Filed: Apr. 24, 2020

(86) PCT No.: PCT/US2020/029770

§ 371 (c)(1),
(2) Date: Oct. 27, 2021

(87) PCT Pub. No.: WO2020/226910

PCT Pub. Date: Nov. 12, 2020

(65) Prior Publication Data

US 2022/0213859 A1 Jul. 7, 2022

Related U.S. Application Data

(60) Provisional application No. 62/842,871, filed on May 3, 2019.

(51) Int. Cl.
*F02P 7/07* (2006.01)
*F02P 15/08* (2006.01)
*F02P 3/04* (2006.01)

(52) U.S. Cl.
CPC ................ *F02P 7/07* (2013.01); *F02P 15/08* (2013.01); *F02P 3/04* (2013.01)

(58) Field of Classification Search
CPC ........ F02P 3/04; F02P 3/05; F02P 5/15; F02P 5/1502; F02P 7/07; F02P 15/08
(Continued)

(56) References Cited

U.S. PATENT DOCUMENTS 4,068,643 A 1/1978 McKechnie
5,513,612 A 5/1996 McAbee et al.
(Continued)

FOREIGN PATENT DOCUMENTS

CN 1475669 A 2/2004
CN 1982693 A 6/2007
(Continued)

OTHER PUBLICATIONS

JP 2007198185 English Translation Version.*
(Continued)

*Primary Examiner* — John Kwon
*Assistant Examiner* — Johnny H Hoang
(74) *Attorney, Agent, or Firm* — Reising Ethington P.C.

(57) ABSTRACT

In at least some implementations, a method of controlling spark events in a combustion engine, includes determining change in voltage at an input of a sensor during an engine revolution, and providing at least two spark event signals to attempt to provide at least two spark events in the engine during the engine revolution. In at least some implementations, the engine revolution is within a first threshold number of engine revolutions from attempted starting of the engine. In at least some implementations, the first threshold may include the first and up to ten engine revolutions from attempted starting of the engine.

13 Claims, 3 Drawing Sheets

(58) Field of Classification Search
USPC .................................. 123/615, 637, 644, 652
See application file for complete search history.

(56) References Cited

U.S. PATENT DOCUMENTS

| | | | | |
|---|---|---|---|---|
| 5,549,090 | A * | 8/1996 | Blount | F02P 7/0775 123/406.6 |
| 5,636,620 | A * | 6/1997 | Kiess | F02P 17/12 123/625 |
| 5,682,860 | A * | 11/1997 | Kollmann | F02P 17/12 123/481 |
| 6,359,439 | B1 * | 3/2002 | Crecelius | F02P 7/077 324/378 |
| 7,249,586 | B2 | 7/2007 | Andersson et al. | |
| 7,448,358 | B2 | 11/2008 | Andersson et al. | |
| 7,546,836 | B2 | 6/2009 | Andersson et al. | |
| 10,995,723 | B2 * | 5/2021 | Dolane | F02P 5/1502 |
| 2002/0017284 | A1 | 2/2002 | Masters | |
| 2005/0268887 | A1 | 12/2005 | Campbell | |
| 2008/0178841 | A1 * | 7/2008 | Andersson | F02P 3/0815 123/406.57 |
| 2016/0076506 | A1 * | 3/2016 | Andersson | F02P 3/0807 123/634 |
| 2020/0132035 | A1 * | 4/2020 | Dolane | F02P 1/086 |
| 2021/0010449 | A1 * | 1/2021 | Abei | F02P 5/1506 |

FOREIGN PATENT DOCUMENTS

| | | | |
|---|---|---|---|
| JP | 2007198185 | A | 8/2007 |
| WO | WO2017015420 | A1 | 1/2017 |
| WO | WO2017185017 | A1 | 10/2017 |

OTHER PUBLICATIONS

Written Opinion & International Search Report for PCT/US2020/029770 dated Jul. 29, 2020, 10 pages.
CN Office Action for CN Application No. 202080033099.9 dated Nov. 1, 2023 (14 pages).

* cited by examiner

ENGINE IGNITION SYSTEM WITH MULTIPLE IGNITION EVENTS

REFERENCE TO RELATED APPLICATIONS

This application claims the benefit of U.S. Provisional Application Ser. No. 62/842,871 filed on May 3, 2019 the entire contents of which are incorporated herein by reference in its entirety.

TECHNICAL FIELD

The present disclosure relates generally to ignition systems for light-duty internal combustion engines.

BACKGROUND

It can sometimes be difficult to start a light-duty internal combustion engine. In the first engine revolutions, a microcontroller that controls spark ignition events might not have sufficient information to know the angular position of the engine crankshaft and therefore might not provide a spark event or might not accurately provide a spark event when needed to cause combustion and starting of the engine. Further, during the initial engine revolutions, the air-fuel mixture in the engine can be more stratified than homogeneous in nature, so it may be difficult to ignite the mixture with a single spark event during each of the initial engine cycles. To provide information about the crankshaft/piston position, additional components, like a multi-tooth input for crankshaft position sensing, camshaft position sensor(s) or other components could be used but this increases the cost and complexity of the system.

SUMMARY

In at least some implementations, a method of controlling spark events in a combustion engine, includes determining a change in voltage at an input of a sensor during an engine revolution, and providing at least two spark event signals to attempt to provide at least two spark events in the engine during the engine revolution. In at least some implementations, the engine revolution is within a first threshold number of engine revolutions from attempted starting of the engine. In at least some implementations, the first threshold may include the first and up to ten engine revolutions from attempted starting of the engine. In at least some implementations, after the first threshold of engine revolutions a single spark is provided during the subsequent engine revolution.

In at least some implementations, a voltage induced at the input of the sensor is either positive or negative more than once per engine revolution and the spark event signals are provided on at least two occasions when the voltage becomes positive or at least two times the voltage becomes negative in a given engine revolution. The spark event signals may be provided each time the voltage becomes positive or each time the voltage becomes negative in a given engine revolution.

In at least some implementations, the number of spark event signals provided during an engine revolution is determined as a function of the magnitude of the voltage at the input.

In at least some implementations, the change in voltage is a transition from zero volts or a negative voltage to a positive value, or a transition from zero volts or a positive voltage to a negative voltage, or a transition from an increasing voltage to a decreasing voltage.

In at least some implementations, the sensor is a VR sensor and the change in voltage is caused by movement of a magnet relative to the VR sensor. The VR sensor may include a wire coil. The magnet may include a leading edge, a trailing edge and a third feature between the leading edge and the trailing edge, and wherein the leading edge, trailing edge and third feature produce changes in a voltage waveform at the VR sensor. The third feature may include a connector that couples the magnet to a flywheel. The leading edge may provide a voltage signal at the VR sensor when an engine piston is between 50 degrees and 10 degrees before top dead center. One of the leading edge, trailing edge and third feature may provide a voltage pulse when an engine piston is between 25 degrees and 0 degrees before top dead center.

In at least some implementations, the method includes determining an engine acceleration or deceleration event, and the engine revolution is at least one revolution within the acceleration or deceleration event.

BRIEF DESCRIPTION OF THE DRAWINGS

The following detailed description of certain embodiments and best mode will be set forth with reference to the accompanying drawings, in which.

DETAILED DESCRIPTION

The methods and systems described herein generally relate to combustion engines that include ignition systems with microcontroller circuitry, including but not limited to light-duty combustion engines. Typically, the light-duty combustion engine is a single cylinder two-stroke or four-stroke gasoline powered internal combustion engine. A piston is slidably received for reciprocation in an engine cylinder and is connected to a crank shaft that, in turn, is attached to a fly wheel. Such engines are often paired with a capacitive discharge ignition (CDI) system that utilizes a microcontroller to supply a high voltage ignition pulse to a spark plug for igniting an air-fuel mixture in the engine combustion chamber. The term "light-duty combustion engine" broadly includes all types of non-automotive combustion engines, including two and four-stroke engines typically used to power devices such as gasoline-powered hand-held power tools, lawn and garden equipment, lawnmowers, weed trimmers, edgers, chain saws, snowblowers, personal watercraft, boats, snowmobiles, motorcycles, all-terrain-vehicles, etc. It should be appreciated that while the following description is in the context of a capacitive discharge ignition (CDI) system, the control circuit and/or the power supply sub-circuit described herein may be used with any number of different ignition systems and are not limited to the particular one shown here. In particular, the ignition system may include an inductive discharge ignition (IDI) system, the details of which may be generally known in the art.

Figure 1:
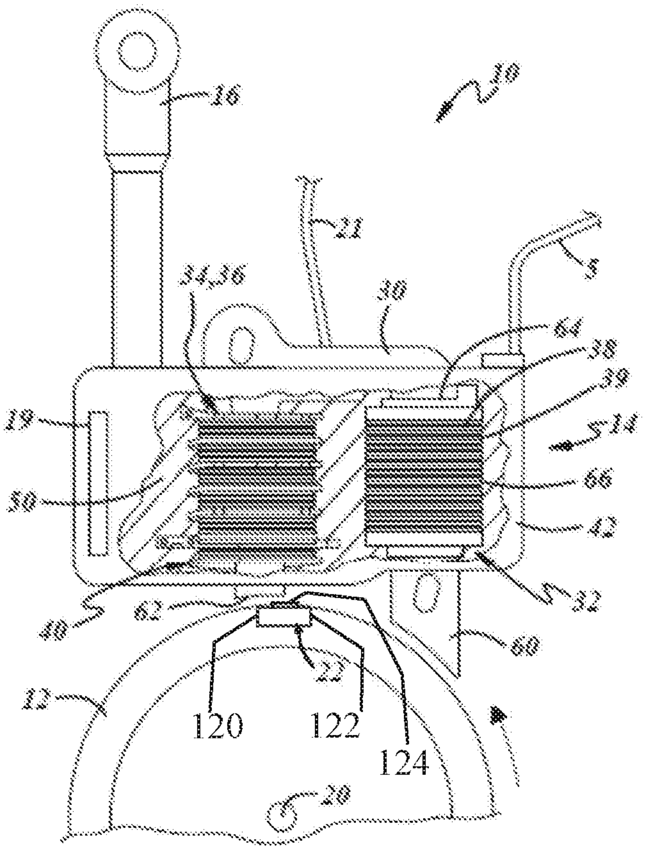
FIG. 1 shows an example of a capacitor discharge ignition (CDI) system for a light-duty combustion engine.

With reference to FIG. 1, there is shown a cut-away view of an exemplary capacitive discharge ignition (CDI) system 10 that interacts with a flywheel 12 and generally includes an ignition module 14, an ignition lead 16 for electrically coupling the ignition module to a spark plug SP (shown in FIG. 2), and electrical connections 5, 21 for coupling the ignition module to one or more auxiliary loads, such as a carburetor solenoid valve. The flywheel 12 shown here includes a pair of magnetic poles or elements 22 located towards an outer periphery of the flywheel. Once flywheel 12 is rotating, magnetic elements 22 spin past and electromagnetically interact with the different coils or windings in ignition module 14 as the crankshaft 20 rotates.

Ignition module 14 can generate, store, and utilize the electrical energy that is induced by the rotating magnetic elements 22 in order to perform a variety of functions. According to one embodiment, ignition module 14 includes a lamstack 30, a charge winding 32, a primary winding 34 and a secondary winding 36 that together constitute a step-up transformer, a first auxiliary winding 38, a second auxiliary winding 39, a trigger winding 40, an ignition module housing 42, and a control circuit 50. Lamstack 30 is preferably a ferromagnetic part that is comprised of a stack of flat, magnetically-permeable, laminate pieces typically made of steel or iron. The lamstack can assist in concentrating or focusing the changing magnetic flux created by the rotating magnetic elements 22 on the flywheel. According to the embodiment shown here, lamstack 30 has a generally U-shaped configuration that includes a pair of legs 60 and 62. Leg 60 is aligned along the central axis of charge winding 32, and leg 62 is aligned along the central axes of trigger winding 40 and the step-up transformer. The first auxiliary winding 38, second auxiliary winding 39 and trigger winding 40 are shown on leg 60, however, these windings or coils could be located elsewhere on the lamstack 30. Magnetic elements 22 can be implemented as part of the same magnet or as separate magnetic components coupled together to provide a single flux path through flywheel 12, to cite two of many possibilities. Additional magnetic elements can be added to flywheel 12 at other locations around its periphery to provide additional electromagnetic interaction with ignition module 14.

Charge winding 32 generates electrical energy that can be used by ignition module 14 for a number of different purposes, including charging an ignition capacitor and powering an electronic processing device, to cite two of many examples. Charge winding 32 includes a bobbin 64 and a winding 66 and, according to one embodiment, is designed to have a relatively low inductance and a relatively low resistance, but this is not necessary.

Trigger winding 40 provides ignition module 14 with an engine input signal that is generally representative of the position and/or speed of the engine. According to the particular embodiment shown here, trigger winding 40 is located towards the end of lamstack leg 62 and is adjacent to the step-up transformer. It could, however, be arranged at a different location on the lamstack. For example, it is possible to arrange both the trigger and charge windings on a single leg of the lamstack, as opposed to arrangement shown here. It is also possible for trigger winding 40 to be omitted and for ignition module 14 to receive an engine input signal from charge winding 32 or some other device.

Step-up transformer uses a pair of closely-coupled windings 34, 36 to create high voltage ignition pulses that are sent to a spark plug SP via ignition lead 16. Like the charge and trigger windings described above, the primary and secondary windings 34, 36 surround one of the legs of lamstack 30, in this case leg 62. The primary winding 34 has fewer turns of wire than the secondary winding 36, which has more turns of finer gauge wire. The turn ratio between the primary and secondary windings, as well as other characteristics of the transformer, affect the voltage and are typically selected based on the particular application in which it is used.

Ignition module housing 42 is preferably made from a plastic, metal, or some other material, and is designed to surround and protect the components of ignition module 14. The ignition module housing has several openings to allow lamstack legs 60 and 62, ignition lead 16, and electrical connections 5, 21 to protrude, and preferably are sealed so that moisture and other contaminants are prevented from damaging the ignition module. It should be appreciated that ignition system 10 is just one example of a capacitive discharge ignition (CDI) system that can utilize ignition module 14, and that numerous other ignition systems and components, in addition to those shown here, could also be used as well.

Control circuit 50 may be carried within the housing 42 or within a housing remote from the flywheel and lamstack and communicated with the ignition module 14 to receive energy from the module 14 and to control, at least in part, operation of the module. For example, a control module may be located on or adjacent to a throttle body, such as is shown and described in PCT Patent Application Serial No. PCT/US2017/028913 filed Apr. 21, 2017 the disclosure of which is incorporated herein by reference in its entirety. Such a module may be responsive to a throttle valve position and/or other variables to control ignition timing, a fuel/air mixture content (such as by varying the amount of fuel or air with a valve), whether to cause an ignition event in a given engine cycle, engine speed control, among other things. The module could be located remotely from the engine and any throttle body, carburetor or other component associated with the engine, for example, in a handle, housing, cowling or other component of a vehicle or device that includes the engine. The control module may be coupled to portions of the ignition module 14 so that it can control, if desired, the energy that is induced, stored and discharged by the ignition system 10. The term "coupled" broadly encompasses all ways in which two or more electrical components, devices, circuits, etc. can be in electrical communication with one another; this includes but is certainly not limited to, a direct electrical connection and a connection via intermediate components, devices, circuits, etc. The control circuit 50 may be provided according to the exemplary embodiment shown in FIG. 2 where the control circuit is coupled to and interacts with charge winding 32, primary ignition winding 34, first auxiliary winding 38, second auxiliary winding 39, and trigger winding 40. According to this particular example, the control circuit 50 includes an ignition discharge capacitor 52, an ignition discharge switch 54, a microcontroller 56, a power supply sub-circuit 58, as well as any number of other electrical elements, components, devices and/or sub-circuits that may be used with the control circuit and are known in the art (e.g., kill switches and kill switch circuitry).

The ignition discharge capacitor 52 acts as a main energy storage device for the ignition system 10. According to the embodiment shown in FIG. 2, the ignition discharge capacitor 52 is coupled to the charge winding 32 and the ignition discharge switch 54 at a first terminal, and is coupled to the primary winding 34 at a second terminal. The ignition discharge capacitor 52 is configured to receive and store electrical energy from the charge winding 32 via diode 70 and to discharge the stored electrical energy through a path that includes the ignition discharge switch 54 and the primary winding 34. Discharge of the electrical energy stored on the ignition discharge capacitor 52 is controlled by the state of the ignition discharge switch 54, as is widely understood in the art. As these components are coupled to one or more coils in the ignition module 14, these components may, if desired, be located within the ignition module on a circuit board 19 or otherwise arranged.

The ignition discharge switch 54 acts as a main switching device for the ignition system 10. The ignition discharge switch 54 is coupled to the ignition discharge capacitor 52 at a first current carrying terminal, to ground at a second current carrying terminal, and to an output of the microcontroller 56 at its gate. As noted herein, the microcontroller 56 may be located remotely, if desired, which is to say not within the ignition module 14. The ignition discharge switch 54 can be provided as a thyristor, for example, a silicon controller rectifier (SCR). An ignition trigger signal from an output of the microcontroller 56 activates the ignition discharge switch 54 so that the ignition discharge capacitor 52 can discharge its stored energy through the switch and thereby create a corresponding ignition pulse in the ignition coil.

The microcontroller 56 is an electronic processing device that executes electronic instructions in order to carry out functions pertaining to the operation of the light-duty combustion engine. This may include, for example, electronic instructions used to implement the methods described herein. In one example, the microcontroller 56 includes the 8-pin processor illustrated in FIG. 2, however, any other suitable controller, microcontroller, microprocessor and/or other electronic processing device may be used instead. Pins 1 and 8 are coupled to the power supply sub-circuit 58, which provides the microcontroller with power that is somewhat regulated; pins 2 and 7 are coupled to trigger winding 40 and provide the microcontroller with an engine signal that is representative of the speed and/or position of the engine (e.g., position relative to top-dead-center); pins 3 and 5 are shown as being connected to a timing sub-circuit which will be described in more detail below; pin 4 is coupled to ground; and pin 6 is coupled to the gate of ignition discharge switch 54 so that the microcontroller can provide an ignition trigger signal, sometimes called a timing signal, for activating the switch. Some non-limiting examples of how microcontrollers can be implemented with ignition systems are provided in U.S. Pat. Nos. 7,546,836 and 7,448,358, the entire contents of which are hereby incorporated by reference.

The power supply sub-circuit 58 receives electrical energy from the charge winding 32, stores the electrical energy, and provides the microcontroller 56 with regulated, or at least somewhat regulated, electrical power. The power supply sub-circuit 58 is coupled to the charge winding 32 at an input terminal 80 and to the microcontroller 56 at an output terminal 82 and, according to the example shown in FIG. 2, includes a first power supply switch 90, a power supply capacitor 92, a power supply zener 94, a second power supply switch 96, and one or more power supply resistors 98. The power supply sub-circuit 58 is designed and configured to reduce the portion of the charge winding load that is attributable to powering the microcontroller 56, or other electrically powered devices, like a solenoid or the like. The components of the power supply sub-circuit 58 may be located in the ignition module, the control module that is separate from the ignition module, or a combination of the two, as desired.

Figure 2:
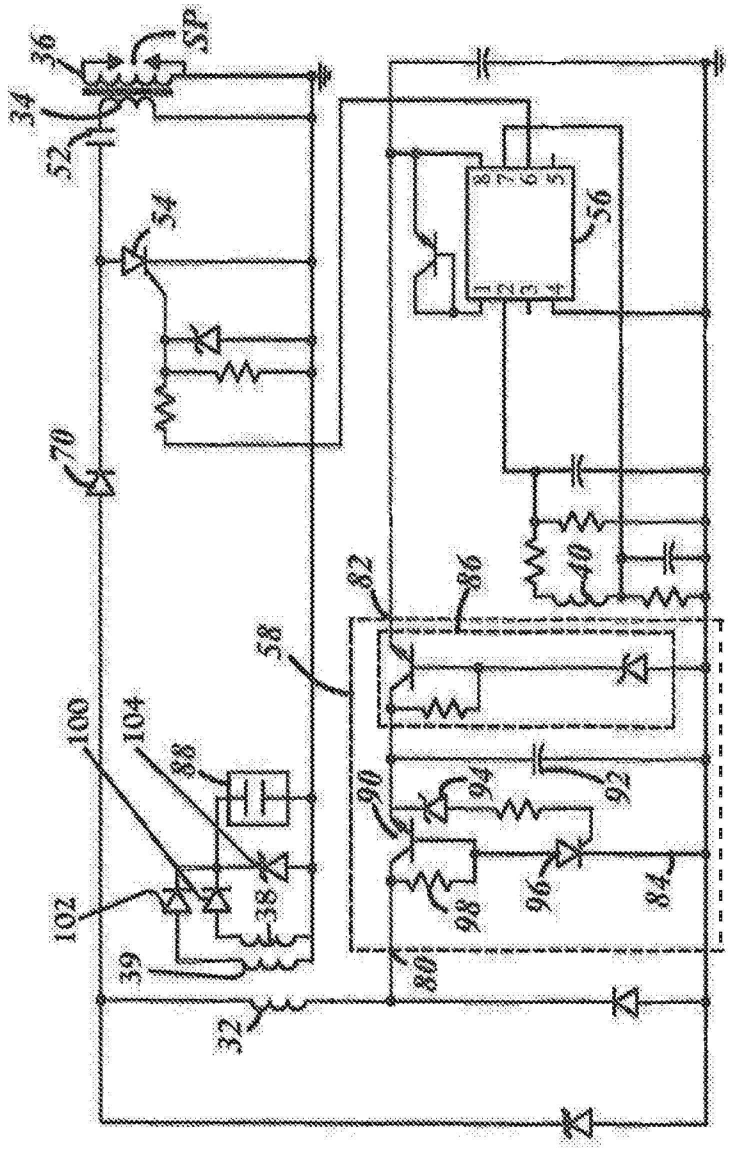
FIG. 2 is a schematic diagram of a circuit that may be used with the CDI system of FIG. 1.

During a charging cycle, electrical energy induced in the charge winding 32 may be used to charge, drive and/or otherwise power one or more devices around the engine. For example, as the flywheel 12 rotates past the ignition module 14, the magnetic elements 22 carried by the flywheel induce an AC voltage in the charge winding 32. A positive component of the AC voltage may be used to charge the ignition discharge capacitor 52, while a negative component of the AC voltage may be provided to the power supply sub-circuit 58 which then powers the microcontroller 56 with regulated DC power. The power supply sub-circuit 58 may be designed to limit or reduce the amount of electrical energy taken from the negative component of the AC voltage to a level that is still able to sufficiently power the microcontroller 56, yet saves energy for use elsewhere in the system, for example to drive a fuel injector in an electronic fuel injection system. Another example of a device that may benefit from this energy savings is a solenoid that is coupled to the windings 38 and 39 and is used to control the air/fuel ratio being provided to the combustion chamber. The power supply sub-circuit may be constructed and arranged as shown in FIG. 2 and as described in PCT Application Publication WO2017/015420.

Beginning with the positive portion of the AC voltage that is induced in the charge winding 32, current flows through diode 70 and charges ignition discharge capacitor 52. So long as the microcontroller 56 holds the ignition discharge switch 54 in an 'off' state, the current from the charge winding 32 is directed to the ignition discharge capacitor 52. It is possible for the ignition discharge capacitor 52 to be charged throughout the entire positive portion of the AC voltage waveform, or at least for most of it. When it is time for the ignition system 10 to fire the spark plug SP (i.e., the ignition timing), the microcontroller 56 sends an ignition trigger signal to the ignition discharge switch 54 that turns the switch 'on' and creates a current path that includes the ignition discharge capacitor 52 and the primary ignition winding 34. The electrical energy stored on the ignition discharge capacitor 52 rapidly discharges via the current path, which causes a surge in current through the primary ignition winding 34 and creates a fast-rising electro-magnetic field in the ignition coil. The fast-rising electro-magnetic field induces a high voltage ignition pulse in the secondary ignition winding 36 that travels to the spark plug SP and provides a combustion-initiating spark. Other sparking techniques, including flyback techniques, may be used instead.

Turning now to the negative component or portion of the AC voltage that is induced in the charge winding 32, current initially flows through the first power supply switch 90 and charges power supply capacitor 92. So long as second power supply switch 96 is turned 'off', there is current flow through power supply resistor 98 so that the voltage at the base of the first power supply switch 90 biases the switch in an 'on' state. Charging of the power supply capacitor 92 continues until a certain charge threshold is met; that is, until the accumulated charge on capacitor 92 exceeds the breakdown voltage of the power supply zener 94. As mentioned above, zener diode 94 is preferably selected to have a certain breakdown voltage that corresponds to a desired charge level for the power supply sub-circuit 58. Some initial testing has indicated that a breakdown voltage of approximately 6 V may be suitable in some light-duty engine applications, although other values may be used. The power supply capacitor 92 uses the accumulated charge to provide the microcontroller 56 with regulated DC power. Of course, additional circuitry like the secondary stage circuitry 86 may be employed for reducing ripples and/or further filtering, smoothing and/or otherwise regulating the DC power.

Once the stored charge on the power supply capacitor 92 exceeds the breakdown voltage of the power supply zener 94, the zener diode becomes conductive in the reverse bias direction so that the voltage seen at the gate of the second power supply switch 96 increases. This turns the second power supply switch 96 'on', which creates a low current path 84 that flows through resistor 98 and switch 96 and lowers the voltage at the base of the first power supply switch 90 to a point where it turns that switch 'off'. With first power supply switch 90 deactivated or in an 'off' state, additional charging of the power supply capacitor 92 is prevented. Accordingly, instead of charging the power supply capacitor 92 during the entire negative portion of the AC voltage waveform, the power supply sub-circuit 58 only charges capacitor 92 for a first segment of the negative portion of the AC voltage waveform; during a second segment, the capacitor 92 is not being charged.

As mentioned above, the electrical energy that is saved or not used by power supply sub-circuit 58 may be applied to any number of different devices around the engine. One example of such a device is a solenoid that controls the air/fuel ratio of the gas mixture supplied from a carburetor to a combustion chamber. Referring back to FIG. 2, the first auxiliary winding 38 and the second auxiliary winding 39 could be coupled to a device 88, such as a solenoid, an additional microcontroller or any other device requiring electrical energy. The first and second auxiliary windings 38 and 39 may be connected in parallel with each other and may each have one terminal coupled to the solenoid via intervening diodes 100 and 102, respectively and their other terminals coupled to ground. A zener diode 104 may be connected in parallel between the solenoid and coils 38 and 39 to protect the solenoid from a voltage greater than the zener diode breakdown voltage (excess current flows through the zener diode to ground).

Because the magnet(s) 22 are fixed to the flywheel 12, the position of the magnet(s) relative to one or more coils of the ignition circuit may be used to determine the position of the flywheel and thus, the position of the crankshaft and piston. This information may also be used to determine the engine speed (e.g. the time from a certain engine position in one revolution to the same engine position in the next revolution may be used to determine the engine speed during that revolution). Use of multiple magnets spaced about the periphery of the flywheel can enhance the resolution of this determination by providing more data points in a revolution. Engine speed may also be determined by a sensor that is responsive to the position of the flywheel. Representative sensors including magnetically responsive sensors like hall-effect sensors or variable reluctance sensors. The flywheel may have teeth and the sensors may be responsive to the passing by of one or more teeth to determine flywheel position and hence, crankshaft position. The trigger coil 40 or a different coil in the ignition module may be used as a VR sensor as noted above.

Figure 3:
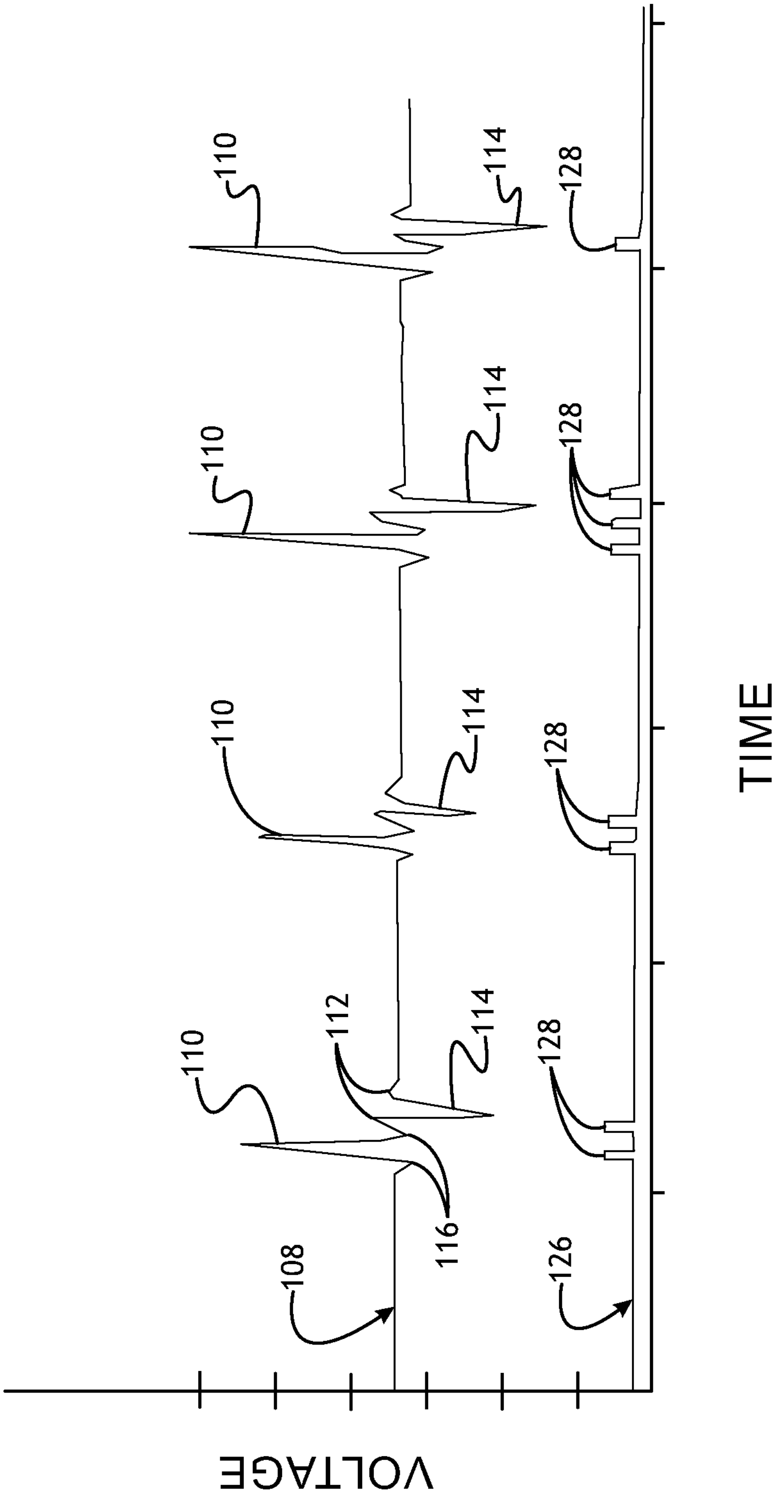
FIG. 3 is a plot of certain engine operational parameters including magnetic pulses from a speed sensor and ignition pulses over four engine revolutions.

As shown in FIG. 3, when the magnet 22 passes by a VR sensor, the voltage at an input of the VR sensor is not simply a single sine wave, and instead a resulting waveform 108 includes multiple positive and negative pulses. In at least some implementations, the pulses include: 1) at least one major positive pulse 110 having a first positive magnitude; 2) at least one minor positive pulse 112 having a second positive magnitude less than the first positive magnitude; 3) at least one major negative pulse 114 having a first negative magnitude; and 4) at least one minor negative pulse 116 having a second negative magnitude less than the first negative magnitude. In the example shown, the pulse includes two minor positive pulses 112 and two minor negative pulses 116. Thus, there are three positive pulses and three negative pulses when a magnet passes by the VR sensor.

In at least some implementations, and in at least some IDI systems more than one of the pulses 110-116 may be used to cause a spark event, or to at least attempt to generate a spark at the spark plug SP. For example, two or more of the positive pulses may be used to generate a like number of spark events, and in at least some implementations, each positive pulse may be used to provide a signal to the microcontroller 56 which in turn may initiate a spark event at the spark plug SP at least when sufficient energy may be provided by the ignition circuit. At least in the first engine revolution upon an attempted engine start, there may be sufficient energy in an IDI system while such energy might not be available until a second or third revolution in a CDI system. The microcontroller 56 may recognize or determine when the pulse moves from zero (or other base value) to a positive value (or value greater than the base), and upon such determination the microcontroller 56 may initiate a spark event. Of course, other portions of the pulse may be used by the microcontroller 56 to cause desired spark events, such as a transition from zero/base to a negative/lower voltage, or a transition from an increasing voltage to a decreasing voltage, etc., and different numbers of spark events may be provided in different engine revolutions or cycles. In at least some implementations, a voltage induced at the input of the sensor is either positive or negative more than once per engine revolution and the spark event signals are provided on at least two occasions when the voltage becomes positive or at least two times the voltage becomes negative in a given engine revolution, and spark event signals may be provided each time the voltage becomes positive or negative, if desired.

With multiple spark triggering points in a pulse, multiple spark events may be generated, for example, during the first one or more engine revolutions in/during an attempt to start the engine. In the first engine revolutions, the microcontroller 56 might not have sufficient information to know the angular position of the engine crankshaft 20 and therefore might not provide a spark event or might not accurately provide a spark event when needed to cause combustion and starting of the engine. Further, during the initial engine revolutions, the air-fuel mixture in the engine typically is more stratified than homogeneous in nature, so it may be beneficial to provide the several spark events during each compression portion of the initial engine cycles to optimize the potential to combust the air-fuel mixture. Thus, the likelihood of combustion in the initial engine revolutions during starting of an internal combustion engine may be improved by providing a spark multiple times during the compression portion of the engine cycle in a two or four stroke engine. Further, this may be done with existing components in the ignition system and engine and without adding cost by using an existing magnet on the flywheel and an existing coil or VR sensor. That is, the system and method of controlling the ignition does not need a multi-tooth input for crankshaft position sensing, camshaft position sensing or other methods of accurately determining crankshaft angular displacement all of which would increase the cost and complexity of the system.

A waveform 108 including the multiple pulses 110-116 over four engine cycles is shown in FIG. 3. The waveform may be caused by different features passing by the VR sensor (or other component that may sense the voltage or in which a voltage may be induced, for example, a wire coil as noted above) each rotation of the crankshaft 20. For example, as shown in FIG. 1, the magnet 22 may include a leading edge 120 at a north or south end of the magnet, a trailing edge 122 at the other end of the magnet (i.e. if the leading edge 120 is at the north end of the magnet, then the trailing edge 122 is at the south end, or vice versa) and a third feature such as the transition between north and south poles of the magnet and/or a connector 124 that retains the magnet 22 on the flywheel 12, like a clip or screw located between the ends of the magnet and a hole or other feature formed in the magnet for the connector. These features 120, 122, 124 may cause a waveform 108 as shown in FIG. 3 each time the magnet 22 is moved past the VR sensor as the flywheel 12 is rotated.

In at least some implementations, the magnet 22 is located on the flywheel 12 in a position that enables the VR sensor signal to occur within or correspond to a range of acceptable spark timing during engine starting. For example, the leading edge 120 of the magnet 22 may provide a signal at the VR sensor when the engine piston is in the compression phase of engine operation such as between 50 degrees and 10 degrees before top dead center (BTDC), and may nominally be at approximately 30 degrees in at least some implementations. In at least some implementations, the third feature (e.g. the connector 124 between the ends 120, 122 of the magnet 22) generates a pulse between the two ends 120, 122 of the magnet 22, and this middle pulse-generating feature may be located so that the pulse occurs at approximately 20 degrees BTDC, and the trailing edge 122 of the magnet 22 may be located so that the pulse associated with the trailing edge 122 occurs at approximately 10 degrees BTDC, and in at least some implementations may be between 25 degrees and −15 degrees BTDC. In at least some implementation, it may be required that one or more of the above features 120, 122, 124 be located so that the corresponding pulse occurs between 25 degrees and 0 degrees BTDC, for suitable ignition timing to start the engine.

The ignition system may use the voltage at an input of the VR sensor to determine crankshaft position. During the first engine revolutions, the crankshaft position might be indeterminate or inaccurate due to the following: on the first passing of the magnet 22 by the sensor, the microcontroller 56 has no previous event to use to determine the angular displacement as a function of time as the time period is infinity; and on the second passing of the magnet 22, the calculated time unit per angular displacement unit (typically degrees Crank Angle (CA)) is often not be very accurate for the next revolution, as the engine is rapidly changing speed. Thus, in a threshold number of the initial engine revolutions upon attempted starting of the engine, the ignition events can be controlled as a function of the waveform 108 (i.e. the voltage) at the VR sensor or other magneto-voltage responsive component(s).

After the threshold number of engine revolutions, the microcontroller 56 can be used to provide spark events according to a normal operation program or method. A simple engine revolution counter may be used to control the hand-off between the two control methods after the threshold number of revolutions have occurred, a hardware component like a switch may be used to cause a change upon sufficient energy being developed in the system (e.g. due to increased engine speed), or the transition between method may occur in any other desired way (e.g. lapse of actual time rather than revolutions, as a function of temperature, as a function of two or more of time, revolutions and temperature, etc).

In line 126 in FIG. 3, it can be seen that during the first engine revolution, the spark control method provided two signals 128 to cause two spark events. The signals 128 may be a voltage provided from the microcontroller 56 to change the state of the ignition switch, or other voltage, as desired. The signals 128 were provided when the waveform became positive the first two times, although as noted above, other triggering events may be used. In the second engine revolution, two spark event signals 128 were provided again as the waveform became positive the first two times. In the third engine revolution, three spark event signals 128 were provided, with each signal provided each time that the waveform 108 became positive. The number of spark event signals provided during a revolution may be pre-programmed in the microcontroller's instructions or in data used by the microcontroller, or it may be determined as a function of one or more factors determined during operation, such as the magnitude of the major positive pulse 110 or a different portion of the waveform 108 (which is a function of rotational speed of the engine crankshaft 20 and attached flywheel 12), engine temperature, air temperature, or the like. In the example shown in FIG. 3, the microcontroller 56 switched to the normal spark event control method and provided a single spark event signal 128 at a time determined in the instructions of the microcontroller 56. In at least some implementations, the first threshold is 10 engine revolutions or fewer. That is, the method may include providing multiple spark events for the first 10 engine revolutions or fewer, as desired for a particular application. After the first threshold number of engine revolutions, the system may change to a different spark event control method.

While described with regard to the initial engine revolutions associated with starting an engine, the system could use the multiple spark event control method during normal operation, if desired. And the system could switch to the multiple spark event control method during times when the angular displacement/position as determined by the microcontroller may be inaccurate or less accurate than desired, such as during rapid acceleration or deceleration events. The microcontroller 56 could determine the occurrence of an acceleration or deceleration event, which may be beyond a threshold (e.g. a certain RPM (revolutions per minute) change threshold), and the microcontroller 56 may switch from the normal control method to the multiple spark event control method, resulting in accurate yet fixed (e.g. tied to the waveform at the VR sensor) spark events. The spark control method to be used at any given time could be programmed or otherwise instructions stored in memory of the microcontroller, and a decision as to which control method to use may be based on rate of acceleration or deceleration, engine speed at beginning of an event, engine load, engine temperature, air temperature, etc.

The forms of the invention herein disclosed constitute presently preferred embodiments and many other forms and embodiments are possible. For example, while the method is described above with regard to discrete points or portions of the waveform being used as a signal that starts the process to cause a spark event, the method/system could cause or attempt to cause a spark event at any of the various points of the waveform. Or, upon initial detection of a voltage from the magnet, or a voltage beyond a threshold, or some other portion of the waveform, the method/system may provide two or more ignition events at a predetermined interval(s) after initial detection. In other words, the ignition events may occur at regular intervals after initial detection of some signal and not as a function of different portions of the waveform. Further, the circuit diagram shown in FIG. 2 and the coil arrangement shown in FIG. 1 are merely examples and are not intended to limit the innovations set forth herein, other circuits and coils may be used, as desired. It is not intended herein to mention all the possible equivalent forms or ramifications of the invention. It is understood that the terms used herein are merely descriptive, rather than limiting, and that various changes may be made without departing from the spirit or scope of the invention.

As used in this specification and claims, the terms "for example," "for instance," "e.g.," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

What is claimed is:

1. A method of controlling spark events in a combustion engine, comprising:

determining a change in voltage at an input of a sensor during an engine revolution caused by movement of a magnet relative to the sensor; and providing at least two spark event signals to attempt to provide at least two spark events in the engine for a single time that the magnet moves past the sensor during the engine revolution, wherein:

a) a voltage induced by movement of the magnet relative to and at the input of the sensor is either positive more than once or negative more than once each time that the magnet moves past the sensor and the spark event signals are provided on at least two occasions when the voltage becomes positive or at least two times the voltage becomes negative in a single time that the magnet moves past the sensor in a given engine revolution; or b) wherein, for the single time that the magnet moves past the sensor, the change in voltage is a transition from zero volts or a negative voltage to a positive value, or a transition from zero volts or a positive voltage to a negative voltage, or a transition from an increasing voltage to a decreasing voltage, and wherein the at least two spark event signals are each provided at a different one of at said transitions for the single time that the magnet moves past the sensor within the engine revolution.

2. The method of claim 1 wherein the engine revolution is within a first threshold number of engine revolutions from attempted starting of the engine.

3. The method of claim 2 wherein the first threshold includes a first and up to ten engine revolutions from attempted starting of the engine.

4. The method of claim 1 wherein the spark event signals are provided each time the voltage becomes positive or each time the voltage becomes negative in a given engine revolution.

5. The method of claim 1 wherein the number of spark event signals provided during an engine revolution is determined as a function of a magnitude of the voltage at the input.

6. The method of claim 1 wherein the sensor is a VR sensor and the change in voltage is caused by movement of a magnet relative to the VR sensor.

7. The method of claim 6 wherein the VR sensor includes a wire coil.

8. The method of claim 3 wherein after the first threshold of engine revolutions a single spark is provided during a subsequent engine revolution.

9. The method of claim 1 which also includes the step of determining an engine acceleration or deceleration event and wherein the engine revolution is one revolution within the acceleration or deceleration event.

10. A method of controlling spark events in a combustion engine, comprising:

determining a change in voltage at an input of a sensor during an engine revolution; and providing at least two spark event signals to attempt to provide at least two spark events in the engine during the engine revolution, wherein:

a) a voltage induced at the input of the sensor is either positive or negative more than once per engine revolution and the spark event signals are provided on at least two occasions when the voltage becomes positive or at least two times the voltage becomes negative in a given engine revolution; or b) wherein the change in voltage is a transition from zero volts or a negative voltage to a positive value, or a transition from zero volts or a positive voltage to a negative voltage, or a transition from an increasing voltage to a decreasing voltage, and wherein the spark event signals are provided at said transitions within the engine revolution, wherein for both subpart (a) and subpart (b) the sensor is a VR sensor and the change in voltage is caused by movement of a magnet relative to the VR sensor, and wherein for both subpart (a) and subpart (b) the magnet includes a leading edge which is a first feature, a trailing edge which is a second feature, and a third feature between the leading edge and the trailing edge, and wherein the leading edge, trailing edge and the third feature produce changes in a voltage waveform at the VR sensor.

11. The method of claim 10 wherein the third feature includes a connector that couples the magnet to a flywheel.

12. The method of claim 10 wherein the leading edge provides a voltage signal at the VR sensor when an engine piston is between 50 degrees and 10 degrees before top dead center.

13. The method of claim 10 wherein one of the leading edge, trailing edge or third feature provides a voltage pulse when an engine piston is between 25 degrees and 0 degrees before top dead center.

* * * * *